(12) United States Patent
Adams et al.

(10) Patent No.: US 12,340,702 B2
(45) Date of Patent: Jun. 24, 2025

(54) METHOD FOR MANAGING THE LONGITUDINAL POSITION OF A FOLLOWER AIRCRAFT WITH RESPECT TO A LEADER AIRCRAFT

(71) Applicant: Airbus SAS, Blagnac (FR)

(72) Inventors: Jordan Lee Adams, Toulouse (FR); Guillaume Ta, Toulouse (FR); Clément Frot, Toulouse (FR)

(73) Assignee: Airbus SAS, Blagnac (FR)

( * ) Notice: Subject to any disclaimer, the term of this patent is extended or adjusted under 35 U.S.C. 154(b) by 139 days.

(21) Appl. No.: 18/333,841

(22) Filed: Jun. 13, 2023

(65) Prior Publication Data
US 2023/0410668 A1    Dec. 21, 2023

(30) Foreign Application Priority Data
Jun. 15, 2022   (FR) .................................... 2205802

(51) Int. Cl.
*G08G 5/50*    (2025.01)
*G05D 1/00*    (2006.01)
(Continued)

(52) U.S. Cl.
CPC .............. *G08G 5/50* (2025.01); *G05D 1/106* (2019.05); *G08G 5/20* (2025.01); *G08G 5/55* (2025.01)

(58) Field of Classification Search
CPC .... G08G 5/0047; G08G 5/0017; G05D 1/106; G05D 1/104
See application file for complete search history.

(56) References Cited

U.S. PATENT DOCUMENTS

| | | | | |
|---|---|---|---|---|
| 3,975,731 | A | * | 8/1976 | Latham ................. G01S 13/785 342/48 |
| 4,674,710 | A | * | 6/1987 | Rodriguez .............. B64C 13/20 244/3 |

(Continued)

FOREIGN PATENT DOCUMENTS

| | | | |
|---|---|---|---|
| DE | 102016103704 A1 | * | 9/2017 |
| EP | 2442201 A2 | | 4/2012 |

(Continued)

OTHER PUBLICATIONS

"Ride comfort in commercial aircraft during formation flight using conventional flight control;" Trollip et al., 2016 IEEE Aerospace Conference (2016, pp. 1-20); Mar. 1, 2016. (Year: 2016).*

(Continued)

*Primary Examiner* — Khoi H Tran
*Assistant Examiner* — Jorge O Peche
(74) *Attorney, Agent, or Firm* — Greer, Burns & Crain, Ltd.

(57) ABSTRACT

A method for managing a longitudinal position a follower aircraft following a leader aircraft by: obtaining a position and speed of the leader aircraft and a real longitudinal position and speed of the follower aircraft; determining a target longitudinal position of the follower aircraft with respect to the longitudinal position of the leader aircraft; calculating a difference between the target longitudinal position of the follower aircraft and the real longitudinal position of the follower aircraft; comparing the value of the difference with at least one predefined threshold; choosing a control law for controlling the speed of the follower aircraft, from among at least two separate control laws, on the basis of the comparison; and, applying the chosen control law so as to manage the real longitudinal position of the follower aircraft with respect to the position of the leader aircraft.

9 Claims, 2 Drawing Sheets

(51) Int. Cl.
*G08G 5/20* (2025.01)
*G08G 5/55* (2025.01)

(56) References Cited

U.S. PATENT DOCUMENTS

| | | | | |
|---|---|---|---|---|
| 5,574,650 | A * | 11/1996 | Diesel | G01C 21/166 702/92 |
| 5,978,715 | A * | 11/1999 | Briffe | G01C 23/00 701/16 |
| 6,057,786 | A * | 5/2000 | Briffe | G01C 23/00 701/4 |
| 6,112,141 | A * | 8/2000 | Briffe | G01C 23/00 345/1.3 |
| 6,178,363 | B1 * | 1/2001 | Mcintyre | G01S 19/52 701/16 |
| 6,271,768 | B1 * | 8/2001 | Frazier, Jr. | G08G 5/55 340/961 |
| 6,459,411 | B2 * | 10/2002 | Frazier | G01S 13/933 340/961 |
| 7,024,309 | B2 * | 4/2006 | Doane | G01S 19/49 701/120 |
| 7,546,183 | B1 * | 6/2009 | Marcum | G01S 1/022 701/17 |
| 8,160,758 | B2 * | 4/2012 | Call | G01S 7/4004 701/301 |
| 8,224,505 | B2 * | 7/2012 | Botargues | G05D 1/042 701/4 |
| 8,463,463 | B1 * | 6/2013 | Feldmann | G05D 1/104 340/963 |
| 8,958,932 | B2 * | 2/2015 | Murphy | B64D 45/04 701/16 |
| 9,104,201 | B1 * | 8/2015 | Pillai | G08G 5/0082 |
| 9,766,073 | B2 * | 9/2017 | Gaultier | B64D 45/00 |
| 10,437,261 | B2 * | 10/2019 | Sahasrabudhe | G05D 1/00 |
| 11,319,069 | B1 * | 5/2022 | Lim | G05D 1/695 |
| 2003/0066926 | A1 * | 4/2003 | Salesse-Lavergne | G05D 1/0055 244/17.13 |
| 2005/0055143 | A1 * | 3/2005 | Doane | G01S 13/933 342/357.32 |
| 2008/0255715 | A1 * | 10/2008 | Elchynski | G01S 19/15 701/16 |
| 2010/0168937 | A1 * | 7/2010 | Soijer | G08G 5/0052 701/11 |
| 2010/0292871 | A1 * | 11/2010 | Schultz | G08G 5/045 342/29 |
| 2011/0106345 | A1 * | 5/2011 | Takacs | G08G 5/54 701/16 |
| 2012/0004844 | A1 * | 1/2012 | Sahasrabudhe | G05D 1/0038 701/300 |
| 2013/0335243 | A1 * | 12/2013 | Smyth, IV | G05D 1/0825 340/966 |
| 2014/0249693 | A1 * | 9/2014 | Stark | G08G 5/045 701/2 |
| 2016/0019797 | A1 * | 1/2016 | Klang | G08G 5/50 701/3 |
| 2016/0117929 | A1 * | 4/2016 | Chan | G08G 5/0026 701/3 |
| 2016/0117931 | A1 * | 4/2016 | Chan | G08G 5/0069 701/120 |
| 2016/0117933 | A1 * | 4/2016 | Chan | G08G 5/0069 705/317 |
| 2016/0140851 | A1 * | 5/2016 | Levy | G08G 5/0069 701/410 |
| 2016/0364989 | A1 * | 12/2016 | Speasl | G08G 5/57 |
| 2018/0074520 | A1 * | 3/2018 | Liu | G08G 5/0013 |
| 2019/0011921 | A1 * | 1/2019 | Wang | G06T 7/246 |
| 2019/0126769 | A1 * | 5/2019 | Schmalzried | G08G 5/0069 |
| 2019/0246626 | A1 * | 8/2019 | Baughman | A01M 31/06 |
| 2019/0302808 | A1 * | 10/2019 | Robin | G08G 5/003 |
| 2019/0310642 | A1 * | 10/2019 | Robin | G05D 1/104 |
| 2019/0315482 | A1 * | 10/2019 | Gu | G05D 1/104 |
| 2020/0005656 | A1 * | 1/2020 | Saunamaeki | G08G 5/0069 |
| 2020/0174502 | A1 * | 6/2020 | Roger | G05D 1/104 |
| 2020/0409394 | A1 * | 12/2020 | Liu | G08G 5/0013 |
| 2021/0300554 | A1 * | 9/2021 | Bergkvist | G08G 5/0034 |
| 2022/0139240 | A1 * | 5/2022 | Marconnet | G08G 5/26 701/17 |
| 2022/0171013 | A1 * | 6/2022 | Kassas | G01S 5/0246 |
| 2022/0189323 | A1 * | 6/2022 | Chaubey | G01S 13/913 |
| 2022/0404843 | A1 * | 12/2022 | Kashawlic | G05D 1/0061 |
| 2023/0008429 | A1 * | 1/2023 | Natiuk | G08G 5/0069 |
| 2023/0315126 | A1 * | 10/2023 | Lu | G05D 1/467 701/3 |
| 2023/0359225 | A1 * | 11/2023 | Frot | G08G 5/0091 |
| 2023/0360543 | A1 * | 11/2023 | Askarpour | G08G 5/0008 |
| 2023/0360544 | A1 * | 11/2023 | Askarpour | G08G 5/0078 |
| 2023/0410668 | A1 * | 12/2023 | Adams | G05D 1/104 |
| 2024/0331555 | A1 * | 10/2024 | Brunot | G01S 1/14 |

FOREIGN PATENT DOCUMENTS

| | | | | |
|---|---|---|---|---|
| EP | 3547065 | A1 * | 10/2019 | G05D 1/104 |
| EP | 2442201 | B1 * | 1/2020 | G05D 1/00 |
| FR | 2931983 | A1 * | 12/2009 | G08G 1/22 |
| JP | 2022104059 | A | * | 7/2022 |
| KR | 20010099988 | A | * | 11/2001 |
| KR | 100583204 | B1 * | 5/2006 | |
| KR | 102366800 | B1 * | 2/2022 | |
| KR | 102527245 | B1 * | 5/2023 | |

OTHER PUBLICATIONS

"Determining Follower Aircraft's Optimal Trajectory in Relation to a Dynamic Formation Ring;" Gotwald et al., ARXIV ID: 2210.01665, Oct. 4, 2022. (Year: 2022).*
"Robust controller design and performance of forward-velocity dynamics of UAVs in close formation flight;" Johnson et al., 2014 International Conference on Advances in Green Energy (ICAGE) (2014, pp. 124-131), Dec. 1, 2014. (Year: 2014).*
French Search Report for corresponding French Patent Application No. 2205802 dated Jan. 9, 2023; priority document.
I. Ransquin, et al., "Wake Vortex Detection and Tracking for Aircraft Formation Flight" Journal of Guidance and Control and Dynamics, Aug. 23, 2021; pp. 1-19.

* cited by examiner

METHOD FOR MANAGING THE LONGITUDINAL POSITION OF A FOLLOWER AIRCRAFT WITH RESPECT TO A LEADER AIRCRAFT

CROSS-REFERENCES TO RELATED APPLICATIONS

This application claims the benefit of French Patent Application No. 2 205 802 filed on Jun. 15, 2022, the entire disclosure of which is incorporated herein by way of reference.

FIELD OF THE INVENTION

The invention relates to the field of formation flying, and relates more particularly to the field of managing the longitudinal position of a follower aircraft with respect to a leader aircraft.

BACKGROUND OF THE INVENTION

It is known to fly aircraft in formation to save energy.

Thus, by way of example, in a demonstration carried out by the applicant, two aircraft flew from Toulouse to Montreal flying in formation. In this formation, two aircraft followed one another, a leader aircraft directed the formation and a follower aircraft followed the leader aircraft while positioning itself in the upward wake of the leader aircraft. It was demonstrated that this formation flying made it possible to save more than six tonnes of carbon dioxide emissions are made it possible to save more than 5% of fuel for the follower aircraft in comparison with the same flight by a single aircraft.

Formation flying involves being able to continuously manage the longitudinal position of the follower aircraft with respect to the leader aircraft.

As is known, the longitudinal position of the follower aircraft is managed using a speed setpoint calculation with longitudinal position and speed feedback. This calculation is expressed as follows: the speed setpoint is equal to the speed of the leader aircraft plus the distance between the leader aircraft and the follower aircraft weighted by a first gain coefficient, plus the difference in speed between the leader aircraft and the follower aircraft weighted by a second gain coefficient.

This calculation necessarily leads to variations in the speed setpoint due to the evolution of the terms used to calculate the distance between the leader aircraft and the follower aircraft, and the evolution of the terms used to calculate the difference in speed.

The setpoint variation is then transmitted within the thrust control chain and leads to a variation in the engine thrust setpoints of the follower aircraft, in particular in cruising mode. As a result, this type of variation may degrade passenger comfort, and it is therefore desirable to avoid such variations.

In this context, it is desirable to provide a method for managing the longitudinal position of a follower aircraft following a leader aircraft in a formation flight that makes it possible to reduce speed setpoint fluctuations so as thus to improve passenger comfort.

SUMMARY OF THE INVENTION

To this end, what is proposed is a method for managing the longitudinal position of at least one follower aircraft following a leader aircraft in a formation flight, the method including at least the following steps:

(a) obtaining a position of the leader aircraft, a real longitudinal position $Xr$ of the follower aircraft, a speed $Sl$ of the leader aircraft and a speed $Sf$ of the follower aircraft;

(b) determining a target longitudinal position $Xt$ of the follower aircraft with respect to the longitudinal position of the leader aircraft;

(c) calculating a difference $Xt-Xr$ between the target longitudinal position $Xt$ of the follower aircraft with respect to the leader aircraft and the obtained real longitudinal position $Xr$ of the follower aircraft with respect to the leader aircraft;

(d) comparing the value of the difference $Xt-Xr$ with at least one predefined threshold;

(e) choosing a control law $SCf$ for controlling the speed $Sf$ of the follower aircraft, from among at least two separate control laws $SCf$, on the basis of the comparison;

(f) applying the chosen control law $SCf$ so as to manage the real longitudinal position $Xr$ of the follower aircraft with respect to the position of the leader aircraft.

Thus, by defining at least one threshold and by choosing a control law for controlling the speed of the follower aircraft, from among at least two separate control laws, on the basis of the comparison with said at least one threshold, the speed of the follower aircraft is managed in increments, thereby avoiding parasitic accelerations or decelerations, thereby allowing more comfortable piloting for passengers of the follower aircraft. In other words, the proposed method makes it possible to manage the longitudinal position of a follower aircraft following a leader aircraft in a formation flight and makes it possible to reduce speed setpoint fluctuations so as thus to improve passenger comfort.

According to one particular provision, the control law $SCf$ is chosen as follows:

if the difference $Xt-Xr$ between the obtained real longitudinal position $Xr$ of the follower aircraft with respect to the leader aircraft and the obtained target longitudinal position $Xt$ of the follower aircraft with respect to the leader aircraft is within an interval of values between a first predefined threshold $Th1$ and a second predefined threshold $Th2$, with $Th1+Xt<Xt<Th2+Xt$, with $Th1$ being negative and $Th2$ being positive, then the chosen control law $SCf$ is defined by: $SC_f=S_l$;

if the difference $Xt-Xr$ between the obtained real longitudinal position $Xr$ of the follower aircraft with respect to the leader aircraft and the target longitudinal position $Xt$ of the follower aircraft with respect to the leader aircraft is within an interval of values between the first predefined threshold $Th1$ and a third predefined threshold $Th3$, with $Th3+Xt<Th1+Xt<Xt$, with $Th3$ being negative, then the chosen control law $SCf$ is defined by: $SC_f=S_l+O_f$, at least until the obtained real longitudinal position $Xr$ of the follower aircraft is greater than a fourth predefined threshold $Th4$, with $Th1 \leq Th4 \leq Xt$, with $Th4$ being negative;

if the difference $Xt-Xr$ between the obtained real longitudinal position $Xr$ of the follower aircraft with respect to the leader aircraft and the target longitudinal position $Xt$ of the follower aircraft with respect to the leader aircraft is less than the third predefined threshold $Th3$, then the chosen control law $SCf$ is defined by: $SC_f=S_l+K_1 \cdot (X_r-X_t)+K_2 \cdot (S_l-S_f)$ until the obtained real longitudinal position Xr of the follower aircraft with respect to the leader aircraft is greater than the fourth predefined threshold Th4;

if the difference Xt−Xr between the obtained real longitudinal position Xr of the follower aircraft with respect to the leader aircraft and the target longitudinal position Xt of the follower aircraft with respect to the leader aircraft is within an interval of values between the second predefined threshold Th2 and a sixth predefined threshold Th6, with Xt<Th2+Xt<Th6+Xt, with Th6 being positive, then the chosen control law is defined by: $SC_f = S_l + O_b$, at least until the obtained real longitudinal position Xr of the follower aircraft is less than a fifth predefined threshold Th5, with Th2≥Th5≥Xt, with Th5 being positive;

if the difference Xt−Xr between the obtained real longitudinal position Xr of the follower aircraft with respect to the leader aircraft and the target longitudinal position Xt of the follower aircraft with respect to the leader aircraft is greater than the sixth predefined threshold Th6, then the chosen control law is defined by: $SC_f = S_l + K_1 \cdot (X_r - X_t) + K_2 \cdot (S_l - S_f)$ until the obtained real longitudinal position Xr of the follower aircraft with respect to the leader aircraft is less than the fifth predefined with $O_f$ being a predetermined positive constant, $K_1$ being a first predefined gain coefficient, $K_2$ being a second predefined gain coefficient, and $O_b$ being a predetermined negative constant.

According to one particular provision, the first threshold Th1, the second threshold Th2, the fourth threshold Th4 and the fifth threshold Th5 are defined by the inequality: Th1<Th4<Xt<Th5<Th2.

According to one particular provision, the control law is kept unchanged if $|SC_f - PSC_f| < L_S$ with $SC_f$ being a speed command for the follower aircraft (Af), $PSC_f$ being a previous speed command for the follower aircraft and $L_S$ being a predefined speed threshold.

According to one particular provision, a Kalman filter is applied to the value of the difference between the obtained speed Sl of the leader aircraft and the speed Sf of the follower aircraft in order to estimate a relative bias on the obtained speed of the leader aircraft.

According to one particular provision, a speed of the leader aircraft is determined by combining low frequencies of a measurement of a Mach number of the leader aircraft and high frequencies of a ground speed of the leader aircraft.

According to another aspect, what is proposed is a computer program product comprising program code instructions for executing the management method when said instructions are executed by a processor.

According to another aspect, what is proposed is a non-transitory storage medium on which there is stored a computer program comprising program code instructions for executing the management method when said instructions are read from said non-transitory storage medium and executed by a processor.

According to another aspect, what is proposed is a computing system comprising electronic circuitry configured to implement management of the longitudinal position of at least one follower aircraft following a leader aircraft in a formation flight, the electronic circuitry implementing at least the following steps:

(a) obtaining a position of the leader aircraft, a real longitudinal position Xr of the follower aircraft with respect to the leader aircraft, a speed Sl of the leader aircraft and a speed Sf of the follower aircraft;

(b) determining a target longitudinal position Xt of the follower aircraft with respect to the longitudinal position of the leader aircraft;

(c) calculating a difference Xt−Xr between the target longitudinal position Xt of the follower aircraft with respect to the leader aircraft and the obtained real longitudinal position Xr of the follower aircraft with respect to the leader aircraft;

(d) comparing the value of the difference Xt−Xr with at least one predefined threshold;

(e) choosing a control law for controlling the speed of the follower aircraft, from among at least two separate control laws, on the basis of the comparison;

(f) applying the chosen control law so as to manage the real longitudinal position Xr of the follower aircraft with respect to the position of the leader aircraft.

According to another aspect, what is proposed is an aircraft including the computing system.

BRIEF DESCRIPTION OF THE DRAWINGS

The features of the invention mentioned above, along with others, will become more clearly apparent on reading the following description of at least one exemplary embodiment, said description being given with reference to the appended drawings, in which.

DETAILED DESCRIPTION OF THE PREFERRED EMBODIMENTS

Figure 1:
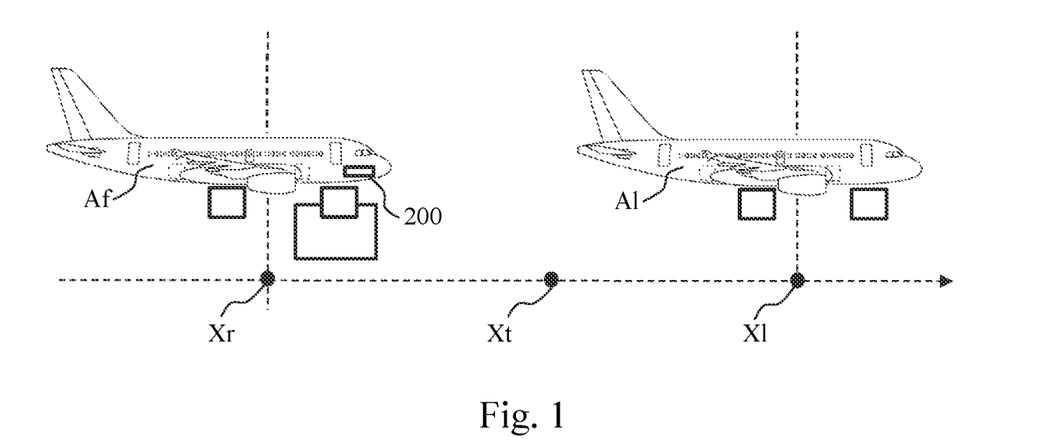
FIG. 1 schematically illustrates a follower aircraft and a leader aircraft, the follower aircraft comprising a computing system comprising electronic circuitry configured to implement management of the longitudinal position of at least one follower aircraft following a leader aircraft in a formation flight.
Figure 2:
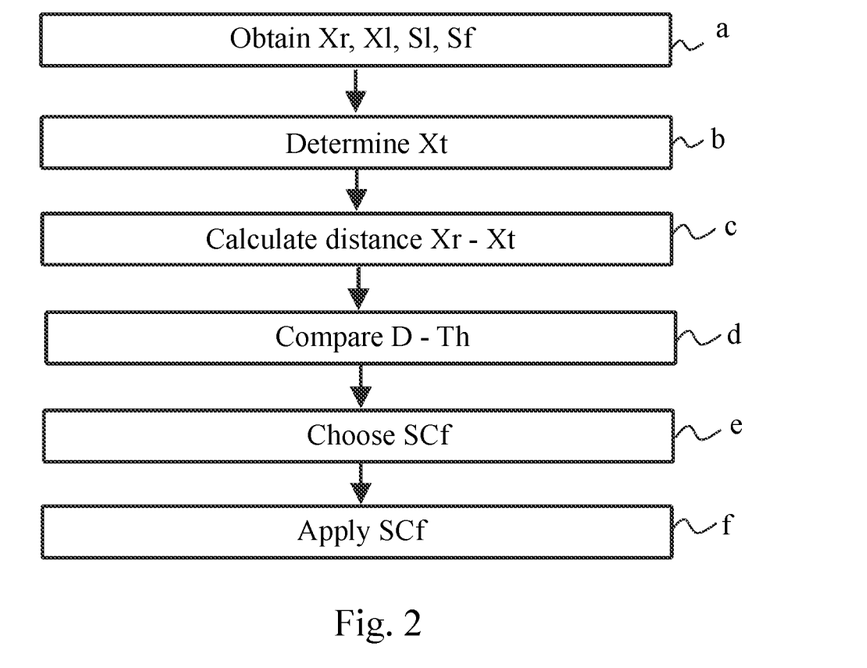
FIG. 2 schematically illustrates the processing of a method for managing the longitudinal position of at least one follower aircraft following a leader aircraft in a formation flight.

With reference to FIG. 2, according to a first aspect, what is proposed is a method for managing the position of at least one follower aircraft Af following a leader aircraft Al in a formation flight. It is specified that longitudinal position of the follower aircraft Af with respect to the leader aircraft Al is understood to mean a horizontal spacing of the follower aircraft Af from the leader aircraft Al in a vertical plane passing through the three-dimensional geographical position of the follower aircraft Af and through the three-dimensional geographical position of the leader aircraft Al. Another definition that also works within the scope of the present invention is that longitudinal position of the follower aircraft Af with respect to the leader aircraft Al is understood to mean an orthogonal projection of the three-dimensional geographical position of the follower aircraft Af onto an axis corresponding to the direction followed by the leader aircraft Al. In this case, the attitude of the follower aircraft Af is obtained in real time in order to carry out this projection. Another definition that also works within the scope of the present invention is that longitudinal position of the follower aircraft Af with respect to the leader aircraft Al is understood to mean the linear distance between the follower aircraft Af and the leader aircraft Al, that is to say the distance between the follower aircraft Af and the leader aircraft Al on the straight line that links the three-dimensional geographical position of the follower aircraft Af and the three-dimensional geographical position of the leader aircraft Al.

It is specified that formation flying is understood to mean a flying configuration in which at least two aircraft follow one another. The first aircraft (the one located in front of the other) is called leader aircraft Al. The second aircraft (the one following) is called follower aircraft Af. It is specified that it is possible to have formations comprising more than two aircraft, in which a follower aircraft Af following a first leader aircraft Al is also a leader aircraft Al leading a second follower aircraft Af.

The method primarily comprises the following steps:
(a) obtaining a position Xl of the leader aircraft Al, a real longitudinal position Xr of the follower aircraft Af with respect to the leader aircraft Al, a speed of the leader aircraft Sl and a speed of the follower aircraft Sf;
(b) determining a target longitudinal position Xt of the follower aircraft Af with respect to the position of the leader aircraft Al;
(c) calculating a difference D Xt−Xr between the target longitudinal position Xt of the follower aircraft Af and the obtained real longitudinal position Xr of the follower aircraft Af;
(d) comparing the value of the difference D with at least one predefined threshold Th;
(e) choosing a control law SCf for controlling the speed of the follower aircraft Af, from among at least two separate control laws SCf, on the basis of the comparison;
(f) applying the chosen control law SCf so as to manage the real longitudinal position Xr of the follower aircraft Af with respect to the position of the leader aircraft Al.

By defining at least one threshold and by choosing a control law SCf for controlling the speed of the follower aircraft Af, from among at least two separate control laws SCf, on the basis of the comparison with said at least one threshold, the speed of the follower aircraft Af is managed in increments, thereby avoiding parasitic accelerations or decelerations, thereby allowing more comfortable piloting for passengers of the follower aircraft Af.

The management method comprises obtaining the real longitudinal position Xr of the follower aircraft with respect to the leader aircraft Al, the position of the leader aircraft Al, the speed of the leader aircraft Al and the speed of the follower aircraft Af.

These various position and speed values may be acquired by known means integrated into each aircraft for determining the position in question and the speed. According to another provision, these values may be acquired by a ground-based and/or satellite monitoring system. Hybrid obtainment by the aircraft themselves and by monitoring systems is also possible. According to one advantageous provision, the follower aircraft Af and the leader aircraft Al communicate with one another so that the follower aircraft Af obtains, from the leader aircraft Al, its position values and speed values.

According to another provision, a single aircraft (for example the follower aircraft Af) may obtain all of the values. In this case, the values corresponding to the other aircraft (for example to the leader aircraft Al if the values are obtained only by the follower aircraft Af) are acquired and/or calculated using known measuring means, such as for example a positioning system and/or a radar.

It is also possible to calculate the speed of the follower aircraft Af as being the time derivative of the real longitudinal position Xr of the follower aircraft Af. The same applies for the speed of the leader aircraft Al, which may be calculated based on the position of the leader aircraft Al as being the time derivative of the position of the leader aircraft Al.

Finally, and as will be expanded on below, it is possible to correct any relative biases when obtaining the speed of the leader aircraft Al.

The method for managing longitudinal position uses the target longitudinal position Xt of the follower aircraft Af with respect to the leader aircraft Al and the real longitudinal position Xr of the follower aircraft Af with respect to the leader aircraft Al.

Figure 3:
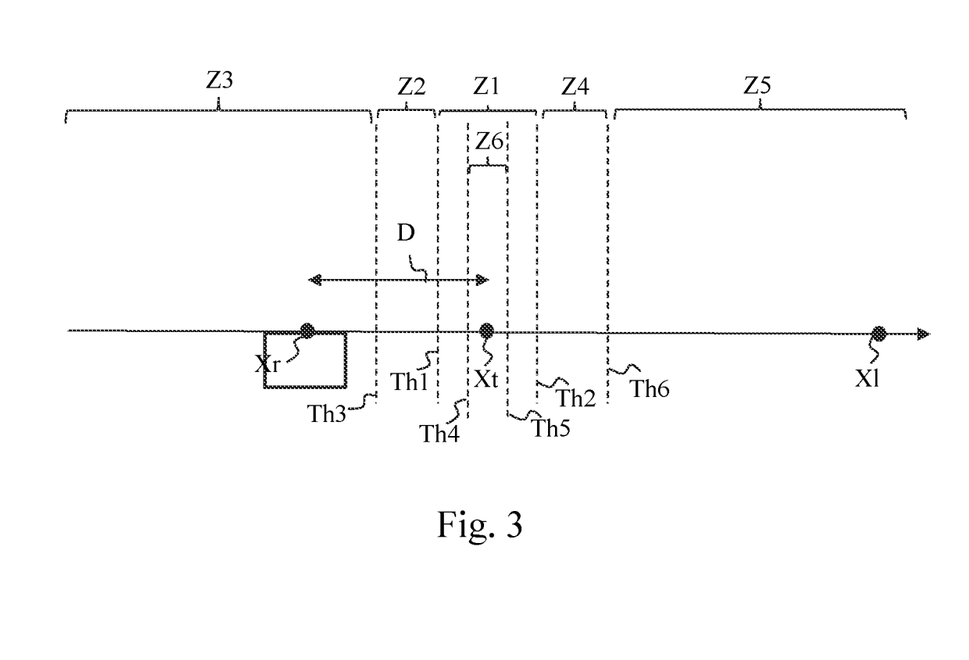
FIG. 3 schematically illustrates the positioning of the various thresholds with respect to the real longitudinal position of a follower aircraft in a method for managing the longitudinal position of at least one follower aircraft following a leader aircraft in a formation flight; and, FIG. 4 schematically illustrates a hardware layout of a computing system that comprises electronic circuitry for implementing management of the longitudinal position of at least one follower aircraft following a leader aircraft in a formation flight.

With reference to FIG. 3, the target longitudinal position Xt of the follower aircraft Af with respect to the leader aircraft Al is a longitudinal position at which the follower aircraft Af should be located to achieve an effective formation flight. This target longitudinal position Xt is determined with respect to the position of the leader aircraft Al. Typically, the target longitudinal position Xt is determined such that the follower aircraft Af is in the upward wake of the leader aircraft Al, at an operating distance that makes it possible to achieve an effective formation flight.

In theory, the follower aircraft Af should maintain the target longitudinal position Xt with respect to the leader aircraft Al. However, in practice, differences in air masses that are passed through may cause the real longitudinal position Xr of the follower aircraft Af to vary with respect to the target longitudinal position Xt of the follower aircraft Af. Indeed, some air masses or turbulence may momentarily slow down the follower aircraft Af. By contrast, other air masses may speed up the follower aircraft Af.

In a particularly clever manner, the management method proposes to control the speed of the follower aircraft Af using distance (difference) thresholds between the target longitudinal position Xt of the follower aircraft Af and the real longitudinal position Xr of the follower aircraft Af.

This control based on thresholds Th makes it possible to define regions, between two thresholds Th in which the control law SCf for controlling the speed of the follower aircraft Af remains substantially unchanged. In addition, as will be expanded on below, the control law SCf differs depending on the region in which the follower aircraft Af is located with respect to the target longitudinal position Xt of the follower aircraft with respect to the leader aircraft Al. In other words, the thresholds Th make it possible to avoid incessant accelerations and decelerations for recalibrating the follower aircraft Af to its target longitudinal position Xt. Thus, the use of threshold contributes to fluid controlling of the control law for controlling the speed of the follower aircraft Af, thereby improving passenger comfort for the follower aircraft. In other words, the use of thresholds contributes to less dynamic controlling of the control law for controlling the follower aircraft Af in comparison with the systems and methods from the prior art.

With reference to FIG. 3, schematically, the thresholds Th define regions Z with a difference D Xt−Xr between the real longitudinal position Xr of the follower aircraft Af and the target longitudinal position Xt of the follower aircraft Af.

According to the embodiment presented here, the management method uses six predefined thresholds Th, identified from Th1 to Th6. Of course, it is possible to use a different number of thresholds Th.

The thresholds Th are distributed considering the target longitudinal position Xt of the follower aircraft Af as origin. Each threshold Th corresponds to a distance from the target longitudinal position Xt of the follower aircraft Af. The thresholds Th are positioned along an axis oriented running from the target longitudinal position Xt of the follower aircraft Af to the position of the leader aircraft Al. Thus, according to the embodiment presented here, when the real longitudinal position Xr of the follower aircraft Af is between the target longitudinal position Xt of the follower aircraft Af with respect to D Xt−Xr between the target longitudinal position Xt of the follower aircraft Af and the real longitudinal position Xr of the follower aircraft Af is expressed positively. Conversely, when the distance between the real longitudinal position Xr of the follower aircraft Af and the position of the leader aircraft Al is greater than the difference D Xt−Xr between the target longitudinal position Xt of the follower aircraft Af and the real longitudinal position Xr of the follower aircraft Af with respect to the leader aircraft Al, then the difference D Xt−Xr between the target longitudinal position Xt of the follower aircraft Af and the real longitudinal position Xr of the follower aircraft Af is expressed negatively.

Thus, according to the embodiment presented here, the first threshold Th1, the third threshold Th3 and the fourth threshold Th4 correspond to positions in which the follower aircraft Af is behind the target longitudinal position Xt. The values of these thresholds Th are therefore expressed negatively with respect to the origin point formed by the target longitudinal position Xt of the follower aircraft Af. Another equivalent way of expressing the longitudinal position of these thresholds Th is to indicate that the distance between the first threshold Th1, the third threshold Th3 and the fourth threshold Th4, with the longitudinal position of the leader aircraft Al is greater than the distance between the target longitudinal position Xt of the follower aircraft Af with respect to the leader aircraft Al and the position of the leader aircraft Al. According to the embodiment presented here, the distance between the first threshold Th1 and the target longitudinal position Xt with respect to the leader aircraft Al is greater than the distance between the fourth threshold Th4 and the target longitudinal position. In addition, the distance between the third threshold Th3 and the target longitudinal position Xt with respect to the leader aircraft Al is greater than the distance between the first threshold Th1 and the target longitudinal position Xt. Thus, in order from the closest to the target longitudinal position Xt to the furthest away, these thresholds may be ranked as follows: fourth threshold Th4, then first threshold Th1, then third threshold Th3.

Likewise, according to the embodiment presented here, the second threshold Th2, the sixth threshold Th6 and the fifth threshold Th5 correspond to positions in which the follower aircraft Af is ahead of the target longitudinal position Xt. The values of these thresholds Th are therefore expressed positively with respect to the origin point formed by the target longitudinal position Xt of the follower aircraft Af. According to the embodiment presented here, the distance between the second threshold Th2 and the target longitudinal position Xt is greater than the distance between the fifth threshold Th5 and the target longitudinal position. In addition, the distance between the sixth threshold Th6 and the target longitudinal position Xt is greater than the distance between the second threshold Th2 and the target longitudinal position Xt. Thus, in order from the closest to the target longitudinal position Xt to the furthest away, these thresholds may be ranked as follows: fifth threshold Th5, then second threshold Th2, then sixth threshold Th6.

Thus, according to the proposed embodiment: Th3<Th1<Th4, with Th1, Th3 and Th4 being negative. In addition, according to the proposed embodiment: Th5<Th2<Th6, with Th5, Th2 and Th6 being positive.

Another equivalent way of expressing the position of these thresholds Th is to indicate that the distance between the second threshold Th2, the sixth threshold Th6 and the fifth threshold Th5, with the longitudinal position of the leader aircraft Al is less than the distance between the target longitudinal position Xt of the follower aircraft Af and the position of the leader aircraft Al.

As indicated above, the thresholds Th make it possible to divide, to create regions Z, and to sectorize the differences between the real longitudinal position Xr of the follower aircraft Af and the target longitudinal position Xt of the follower aircraft Af.

Thus, as shown schematically in FIG. 3, the target longitudinal position Xt of the follower aircraft Af is predetermined with respect to the longitudinal position Xl of the leader aircraft Al.

A first region Z1 is defined around the target longitudinal position Xt of the follower aircraft Af. This first region Z1 is bounded by the first predefined threshold Th1 and the second predefined threshold Th2. In other words, this first region Z1 corresponds to an interval of values of differences D between the first predefined threshold Th1 and the second predefined threshold Th2.

A second region Z2 is bounded by the first predefined threshold Th1 and the third predefined threshold Th3. In other words, this second region Z2 corresponds to an interval of negative values of differences D between the first predefined threshold Th1 and the third predefined threshold Th3. As shown schematically in FIG. 3, the second region Z2 corresponds to a region in which the real longitudinal position Xr of the follower aircraft Af is behind the target longitudinal position Xt.

A third region Z3 is bounded by the third predefined threshold Th3 and extends potentially to at least infinity. In other words, this third region Z3 corresponds to the negative values of differences D less than the third predefined threshold Th3. As shown schematically in FIG. 3, the third region Z3 corresponds to a region in which the real longitudinal position Xr of the follower aircraft Af is behind the target longitudinal position Xt of the follower aircraft Af. According to the example shown schematically in FIG. 3, the real longitudinal position Xr of the follower aircraft Af is in the third region Z3.

A fourth region Z4 is bounded by the second predefined threshold Th2 and the sixth predefined threshold Th6. In other words, this second region Z2 corresponds to an interval of positive values of differences D between the second predefined threshold Th2 and the sixth predefined threshold Th6. As shown schematically in FIG. 3, the fourth region Z4 corresponds to a region in which the real longitudinal position Xr of the follower aircraft Af is ahead of the target longitudinal position Xt.

A fifth region Z5 is bounded by the sixth predefined threshold Th6 and extends potentially to the position of the leader aircraft Al (to within a safety margin). In other words, this fifth region Z5 corresponds to the positive values of differences D Xt−Xr greater than the sixth predefined threshold. As shown schematically in FIG. 3, the fifth region Z5 corresponds to a region in which the real longitudinal position Xr of the follower aircraft Af is ahead of the target longitudinal position Xt of the follower aircraft Af.

A sixth region Z6 is defined around the target longitudinal position Xt of the follower aircraft Af. This sixth region Z6 is bounded by the fourth predefined threshold Th4 and a fifth predefined threshold Th5. In other words, this sixth region Z6 corresponds to an interval of values of differences D between the fourth predefined threshold Th4 and the fifth predefined threshold Th5. The sixth region Z6 is within the first region Z1.

If the difference D Xt−Xr between the obtained real longitudinal position Xr of the follower aircraft Af and the target longitudinal position Xt of the follower aircraft Af is within an interval of values between the first predefined threshold Th1 and the second predefined threshold Th2, then the chosen control law is defined by: $SC_f=S_l$, where $SC_f$ is a speed command for the follower aircraft Af, and $S_L$ is the obtained speed of the leader aircraft Al.

Thus, in other words, when the real longitudinal position Xr of the follower aircraft Af is in the first region Z1 around the target longitudinal position Xt of the follower aircraft Af, then the applied speed control law SCf states that the speed Sf of the follower aircraft Af is equal to the speed Sl of the leader aircraft Al, with potentially a predefined margin around the value of the speed Sl of the leader aircraft.

If the difference D Xt−Xr between the obtained real longitudinal position Xr of the follower aircraft Af and the target longitudinal position Xt of the follower aircraft Af is within an interval of values between the first predefined threshold Th1 and the third predefined threshold Th3, then the chosen control law SCf is defined by: $Sc_f=S_l+O_f$, where $SC_f$ is a speed command for the follower aircraft Af, $S_l$ is the obtained speed of the leader aircraft Al and $O_f$ is a predetermined positive constant.

Thus, in other words, when the real longitudinal position Xr of the follower aircraft Af is in the second region Z2, then the follower aircraft Af is behind its target longitudinal position Xt. The chosen control law SCf then makes it possible to make up for the delay by adding a positive catch-up constant Of that is added to the speed Sl of the leader aircraft Al.

Applying this chosen control law SCf allows the follower aircraft Af to make up for its delay so as to return to the first region Z1 and if possible to the target longitudinal position Xt of the follower aircraft Af with respect to the leader aircraft Al.

To guarantee fluidity of the management method, hysteresis is preferably introduced. Specifically, this control law SCf is applied until the obtained real longitudinal position Xr of the follower aircraft Af is between the fourth predefined threshold Th4 and the fifth predefined threshold Th5.

In other words, the speed control law SCf chosen when the follower aircraft Af is in the second region Z2 is applied at least until the follower aircraft Af enters the sixth region Z6. As a result, when the follower aircraft Af is in the second region Z2, the chosen control law SCf is applied at least until it reaches the sixth region Z6 (which signifies that the follower aircraft Af passes through part of the first region Z1 without changing speed control law).

This provision makes it possible to bring the follower aircraft Af as close as possible to the target longitudinal position Xt of the follower aircraft Af, before changing control law SCf. In other words, this makes it possible to avoid a phenomenon of oscillating between two control laws if the control law had to change as soon as the follower aircraft Af entered the first region Z1. This provision thus also makes it possible to reduce speed setpoint fluctuations and thus makes it possible to improve passenger comfort for the follower aircraft Af.

If the difference D Xt−Xr between the obtained real longitudinal position Xr of the follower aircraft Af and the target longitudinal position Xt of the follower aircraft Af is less than the third predefined threshold Th3, even if the control law SCf for the region Z2 has been engaged, then the chosen control law SCf is defined by: $Sc_f=S_l+K_1\cdot(X_r-X_t)+K_2\cdot(S_l-S_f)$, where $SC_f$ is a speed command for the follower aircraft Af, $S_l$ is the obtained speed of the leader aircraft Al, $X_r$ is the obtained real longitudinal position Xr of the follower aircraft Af, $X_t$ is the target longitudinal position Xt of the follower aircraft Af, $K_1$ is a first predefined gain coefficient, $K_2$ is a second predefined gain coefficient, $S_l$ is the obtained speed of the leader aircraft Al, and $S_f$ is the obtained speed of the follower aircraft Af.

In this situation, when the follower aircraft Af is in the third region Z3, it has to make up for a significant delay to return to the target longitudinal position Xt of the follower aircraft Af with respect to the leader aircraft Al. Applying this speed control law SCf makes it possible to quickly make up for the delay of the follower aircraft Af.

It is specified that the values of the gain coefficients K1 and K2 are determined through empirical knowledge of the behavior of the aircraft in formation. According to one embodiment, the first predefined gain coefficient K1 may be of the order of $10^{-4}$ and the second predefined gain coefficient K2 may be of the order of $10^{-1}$. It is specified that these values of the first gain coefficient K1 and of the second gain coefficient K2 were determined for longitudinal position and distance values expressed in meters and speed values expressed in Mach. According to other examples, it is conceivable to use other units for the longitudinal position and distance values and for the speed values, which would lead to different values for the first gain coefficient K1 and for the second gain coefficient K2.

Applying this chosen control law allows the follower aircraft Af to make up for its delay so as to return to the first region Z1 and, if possible, to the target longitudinal position Xt of the follower aircraft Af.

To guarantee fluidity of the management method, hysteresis is preferably introduced. Specifically, this control law SCf is applied until the obtained real longitudinal position Xr of the follower aircraft Af with respect to the leader aircraft Al is between the fourth predefined threshold Th4 and the fifth predefined threshold Th5 around the target longitudinal position Xt.

In other words, the speed control law SCf chosen when the follower aircraft Af is in the third region Z3 is applied until the follower aircraft Af enters the sixth region Z6. As a result, when the follower aircraft Af is in the third region Z3, the chosen control law SCf is applied until it reaches the sixth region Z6 (which signifies that the follower aircraft Af passes through the second region Z2 and part of the first region Z1 without changing speed control law).

This provision makes it possible to bring the follower aircraft Af as close as possible to the target longitudinal position Xt of the follower aircraft Af with respect to the leader aircraft Al, before changing control law SCf. In other words, this makes it possible to avoid a phenomenon of oscillating between two control laws if the control law had to change as soon as the follower aircraft Af entered the second region Z2 and then the first region Z1. This provision thus also makes it possible to reduce speed setpoint fluctuations and thus makes it possible to improve passenger comfort for the follower aircraft Af.

If the difference D Xt−Xr between the obtained real longitudinal position Xr of the follower aircraft Af and the target longitudinal position Xt of the follower aircraft Af is within an interval of values between the second predefined threshold Th2 and the sixth predefined threshold Th6, then the chosen control law SCf is defined by: $SC_f = S_l + O_b$, where $SC_f$ is a speed command for the follower aircraft Af, $S_l$ is the obtained speed of the leader aircraft Al and $O_b$ is a predetermined negative constant.

Thus, in other words, when the real longitudinal position Xr of the follower aircraft Af with respect to the leader aircraft Al is in the fourth region Z4, then the follower aircraft Af is ahead of its target longitudinal position Xt with respect to the leader aircraft Al. The chosen control law SCf then makes it possible to reduce the advance by adding a negative catch-up constant Ob that is added to the speed Sl of the leader aircraft Al. In other words, the catch-up constant is subtracted from the speed of the leader aircraft Al in order to determine the speed Sf of the follower aircraft Af and thus slow it down.

Applying this chosen control law SCf allows the follower aircraft Af to reduce its advance so as to return to the first region Z1 and, if possible, to the target longitudinal position Xt of the follower aircraft Af with respect to the leader aircraft Al.

To guarantee fluidity of the management method, hysteresis is preferably introduced. Specifically, this control law SCf is applied at least until the obtained real longitudinal position Xr of the follower aircraft Af is between a fourth predefined threshold Th4 and a fifth predefined threshold Th5 around the target longitudinal position Xt.

In other words, the speed control law SCf chosen when the follower aircraft Af is in the fourth region Z4 is applied at least until the follower aircraft Af enters the sixth region Z6. As a result, when the follower aircraft Af is in the fourth region Z4, the chosen control law SCf is applied until it reaches the sixth region Z6 (which signifies that the follower aircraft Af passes through part of the first region Z1 without changing speed control law).

This provision makes it possible to bring the follower aircraft Af as close as possible to the target longitudinal position Xt of the follower aircraft Af, before changing control law SCf. In other words, this makes it possible to avoid a phenomenon of oscillating between two control laws if the control law had to change as soon as the follower aircraft Af entered the first region Z1. This provision thus also makes it possible to reduce speed setpoint fluctuations and thus makes it possible to improve passenger comfort for the follower aircraft Af.

If the difference D Xt−Xr between the obtained real longitudinal position Xr of the follower aircraft Af and the target longitudinal position Xt of the follower aircraft Af is greater than the sixth predefined threshold Th6, even if the control law SCf for the region Z4 has been engaged, then the chosen control law SCf is defined by: $SC_f = S_l + K_1 \cdot (X_r - X_t) + K_2 \cdot (S_1 - S_f)$, where $SC_f$ is a speed command for the follower aircraft Af, $S_l$ is the obtained speed of the leader aircraft Al, X, is the obtained real longitudinal position Xr of the follower aircraft Af with respect to the leader aircraft Al, $X_t$ is the target longitudinal position of the follower aircraft Af with respect to the leader aircraft Al, $K_1$ is a first predefined gain coefficient, $K_2$ is a second predefined gain coefficient, $S_l$ is the obtained speed of the leader aircraft Al, and $S_f$ is the obtained speed of the follower aircraft Af.

In this situation, when the follower aircraft Af is in the fifth region Z5, it has to reduce a significant advance to return to the target longitudinal position of the follower aircraft Af with respect to the leader aircraft Al. Applying this speed control law makes it possible to quickly reduce the advance of the follower aircraft Af.

It is specified that the values of the gain coefficients are determined through empirical knowledge of the behavior of the aircraft in formation. According to one embodiment, the first predefined gain coefficient K1 may be of the order of and the second predefined gain coefficient K2 may be of the order of $10^{-1}$. It is specified that these values of the first gain coefficient K1 and of the second gain coefficient K2 were determined for position and distance values expressed in meters and speed values expressed in Mach. According to other examples, it is conceivable to use other units for the position values and for the speed values, which would lead to different values for the first gain coefficient K1 and for the second gain coefficient K2.

Applying this chosen control law allows the follower aircraft Af to reduce its advance so as to return to the first region and, if possible, to the target longitudinal position Xt of the follower aircraft Af.

To guarantee fluidity of the management method, hysteresis is preferably introduced. Specifically, this control law is applied until the obtained real longitudinal position Xr of the follower aircraft Af is between the fourth predefined threshold Th4 and the fifth predefined threshold Th5 around the target longitudinal position Xt.

In other words, the speed control law SCf chosen when the follower aircraft Af is in the fifth region Z5 is applied until the follower aircraft Af enters the sixth region Z6. As a result, when the follower aircraft Af is in the fifth region Z5, the chosen control law SCf is applied until it reaches the sixth region Z6 (which signifies that the follower aircraft Af passes through the fourth region Z4 and part of the first region Z1 without changing speed control law).

This provision makes it possible to bring the follower aircraft Af as close as possible to the target longitudinal position Xt of the follower aircraft Af with respect to the leader aircraft Al, before changing control law. In other words, this makes it possible to avoid a phenomenon of oscillating between two control laws if the control law had to change as soon as the follower aircraft Af entered the fourth region Z4 and then the first region Z1. This provision thus also makes it possible to reduce speed setpoint fluctuations and thus makes it possible to improve passenger comfort for the follower aircraft Af.

According to one particularly advantageous provision, the control law SCf is kept unchanged if $|SC_f - PSC_f| < L_S$ with $SC_f$ being a speed command for the follower aircraft Af, $PSC_f$ being a previous speed command for the follower aircraft Af and $L_S$ being a predefined speed threshold.

In other words, the speed control law SCf is kept unchanged if the absolute value of the difference between a speed to be applied and the (previously applied) current speed is less than a predefined threshold. This provision makes it possible to avoid parasitic accelerations or decelerations in order to improve passenger comfort for the follower aircraft Af. This provision thus also makes it possible to reduce speed setpoint fluctuations and thus makes it possible to improve passenger comfort for the follower aircraft Af.

In addition, according to another particularly advantageous provision, the speed control law SCf is modulated so that the speed Sf of the follower aircraft Af remains within the sixth region Z6. Modulating the control law SCf may also make it possible to reduce the number of transitions between the sixth region Z6 and the other regions.

Preferably, a Kalman filter is applied to the difference between the obtained speed Sl of the leader aircraft Al and the speed Sf of the follower aircraft in order to estimate a relative bias on the obtained speed Sl of the leader aircraft Al.

According to another embodiment, a speed Sl of the leader aircraft Al is determined by combining low frequencies of a measurement of a Mach number of the leader aircraft Al and high frequencies of a ground speed of the leader aircraft Al. This provision makes it possible to obtain a speed Sl of the leader aircraft Al precisely, in the face of rapid variations in air masses and turbulence.

According to another aspect, what is proposed is a computer program product comprising program code instructions for executing the management method when said instructions are executed by a processor.

The invention also relates to a non-transitory storage medium on which there is stored a computer program comprising program code instructions for executing the management method when said instructions are read from said non-transitory storage medium and executed by a processor.

According to another aspect, the invention relates to a computing system 200 comprising electronic circuitry configured to implement management of the longitudinal position of at least one follower aircraft Af following a leader aircraft Al in a formation flight, the electronic circuitry implementing at least the following steps:

(a) obtaining a position of the leader aircraft Al, a real longitudinal position Xr of the follower aircraft Af with respect to the leader aircraft Al, a speed of the leader aircraft Al and a speed of the follower aircraft Af;

(b) determining a target longitudinal position Xt of the follower aircraft Af with respect to the position of the leader aircraft Al;

(c) calculating a difference D Xt–Xr between the target longitudinal position Xt of the follower aircraft Af and the obtained real longitudinal position Xr of the follower aircraft Af;

(d) comparing the value of the difference D Xt–Xr with at least one predefined threshold Th;

(e) choosing a control law SCf for controlling the speed of the follower aircraft Af, from among at least two separate control laws SCf, on the basis of the comparison;

(f) applying the chosen control law SCf so as to manage the real longitudinal position Xr of the follower aircraft Af with respect to the position of the leader aircraft Al.

The method implemented by the electronic circuitry may be supplemented with other steps, as disclosed above, in any one of the outlined embodiments.

Figure 4:
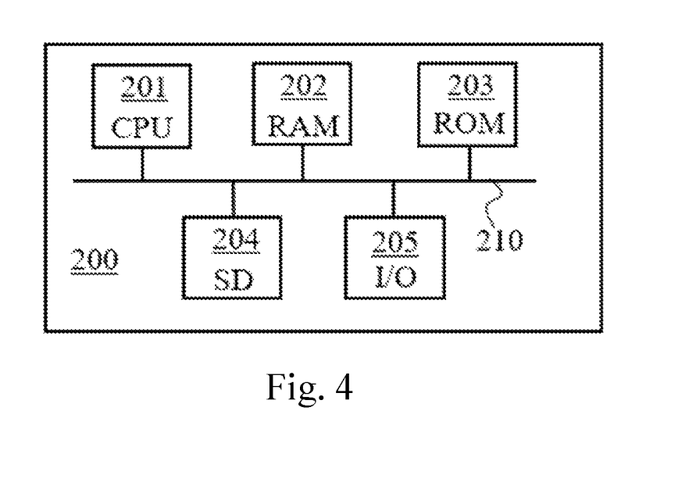

Typically, the computing system 200 may have an architecture as shown schematically in FIG. 4. The computing system 200 may comprise the following, connected by a communication bus 210: a processor 201; a random access memory 202; a read-only memory 203, for example a ROM (read-only memory) or EEPROM (electrically erasable programmable read-only memory); a storage unit 204, such as a hard disk drive (HDD) or a storage medium reader, such as an SD (Secure Digital) card reader; an input/output interface manager 205.

The processor 201 is capable of executing instructions loaded into the random access memory 202 from the read-only memory 203, from an external memory, from a storage medium (such as an SD card), or from a communication network. When the computing system 200 is powered up, the processor 201 is capable of reading instructions from the random access memory 202 and of executing them. These instructions form a computer program that causes the processor 201 to implement all or part of the method for managing the longitudinal position of the follower aircraft Af with respect to the leader aircraft Al.

All or some of the methods and steps described above may thus be implemented in software form through the execution of a set of instructions by a programmable machine, for example a DSP (digital signal processor) or a microcontroller, or be implemented in hardware form by a machine or a dedicated component, for example an FPGA (field-programmable gate array) or ASIC (application-specific integrated circuit) component. Generally speaking, the computing system 200 comprises electronic circuitry designed and configured to implement, in software form and/or hardware form, the methods and steps described above in relation to the computing system 200 in question.

According to another aspect, the invention relates to an aircraft configured to be the follower aircraft Af described above and including the computing system 200.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing a longitudinal position of at least one follower aircraft following a leader aircraft in a formation flight, the method comprising:

(a) obtaining a position of a leader aircraft, a real longitudinal position Xr of a follower aircraft, a speed Sl of the leader aircraft, and a speed Sf of the follower aircraft;

(b) determining a target longitudinal position Xt of the follower aircraft with respect to the longitudinal position of the leader aircraft;

(c) calculating a difference Xt–Xr between the target longitudinal position Xt of the follower aircraft with respect to the leader aircraft and the obtained real longitudinal position Xr of the follower aircraft with respect to the leader aircraft;

(d) comparing a value of the difference Xt–Xr with at least one predefined threshold;

(e) choosing a control law SCf for controlling the speed Sf of the follower aircraft, from among at least two separate control laws SCf, on a basis of the comparing;

(f) applying the chosen control law SCf in order to manage the real longitudinal position Xr of the follower aircraft with respect to the position of the leader aircraft, and, (g) applying, through the chosen control law SCf, when said chosen control law SCf comprises a term equal to a difference between the speed Sl of the leader aircraft and the speed Sf of the follower aircraft, a filter to a value of said difference between the speed Sl of the leader aircraft and the speed Sf of the follower aircraft in order to estimate a relative bias on the speed of the leader aircraft, and wherein the follower aircraft executes the chosen control law SCf to adjust the real longitudinal position Xr of the follower aircraft with respect to the position of the leader aircraft.

2. The method according to claim 1, wherein the control law SCf is chosen as follows:

when the difference Xt−Xr between the obtained real longitudinal position Xr of the follower aircraft with respect to the leader aircraft and the obtained target longitudinal position Xt of the follower aircraft with respect to the leader aircraft is within an interval of values between a first predefined threshold Th1 and a second predefined threshold Th2, with Th1+Xt<Xt<Th2+Xt, with Th1 being negative and Th2 being positive, then the chosen control law SCf is defined by: SCf=Sl;

when the difference Xt−Xr between the obtained real longitudinal position Xr of the follower aircraft with respect to the leader aircraft and the target longitudinal position Xt of the follower aircraft with respect to the leader aircraft is within an interval of values between the first predefined threshold Th1 and a third predefined threshold Th3, with Th3+Xt<Th1+Xt<Xt, with Th3 being negative, then the chosen control law SCf is defined by: SCf=Sl+Of, at least until the obtained real longitudinal position Xr of the follower aircraft is greater than a fourth predefined threshold Th4, with Th1≤Th4≤Xt, with Th4 being negative;

when the difference Xt−Xr between the obtained real longitudinal position Xr of the follower aircraft with respect to the leader aircraft and the target longitudinal position Xt of the follower aircraft with respect to the leader aircraft is less than the third predefined threshold Th3, then the chosen control law SCf is defined by: SCf=Sl+K1(Xr−Xt)+K2(Sl−Sf) until the obtained real longitudinal position Xr of the follower aircraft (Af) with respect to the leader aircraft is greater than the fourth predefined threshold Th4;

when the difference Xt−Xr between the obtained real longitudinal position Xr of the follower aircraft with respect to the leader aircraft and the target longitudinal position Xt of the follower aircraft with respect to the leader aircraft is within an interval of values between the second predefined threshold Th2 and a sixth predefined threshold Th6, with Xt<Th2+Xt<Th6+Xt, with Th6 being positive, then the chosen control law is defined by: SCf=Sl+Ob, at least until the obtained real longitudinal position Xr of the follower aircraft is less than a fifth predefined threshold Th5, with Th2≥Th5≥Xt, with Th5 being positive;

when the difference Xt−Xr between the obtained real longitudinal position Xr of the follower aircraft with respect to the leader aircraft and the target longitudinal position Xt of the follower aircraft with respect to the leader aircraft is greater than the sixth predefined threshold Th6, then the chosen control law is defined by: SCf=Sl+K1(Xr−Xt)+K2(Sl−Sf) until the obtained real longitudinal position Xr of the follower aircraft with respect to the leader aircraft is less than the fifth predefined threshold Th5;

with Of being a predetermined positive constant, K1 being a first predefined gain coefficient, K2 being a second predefined gain coefficient, and Ob being a predetermined negative constant.

3. The method according to claim 2, wherein the first threshold Th1, the second threshold Th2, the fourth threshold Th4 and the fifth threshold Th5 are defined by: Th1<Th4<Xt<Th5<Th2.

4. The method according to claim 1, wherein the control law is kept unchanged when |SCf−PSCf|<Ls with SCf being a speed command for the follower aircraft (Af), PSCf being a previous speed command for the follower aircraft and Ls being a predefined speed threshold.

5. The method according to claim 1, wherein the filter applied to estimate the relative bias on the speed of the leader aircraft is a Kalman filter.

6. The method according to claim 1, wherein the speed of the leader aircraft is obtained by combining low frequencies of a measurement of a Mach number of the leader aircraft and high frequencies of a ground speed of the leader aircraft.

7. A non-transitory storage medium comprising:
a computer program comprising instructions for executing the method according to claim 1 when said instructions are read from said non-transitory storage medium and executed by a processor.

8. A system comprising:
electronic circuitry configured to implement a management of the longitudinal position of a follower aircraft following a leader aircraft in a formation flight, the electronic circuitry implementing at least the following steps:
(a) obtaining a position of the leader aircraft, a real longitudinal position Xr of the follower aircraft with respect to the leader aircraft, a speed Sl of the leader aircraft, and a speed Sf of the follower aircraft;
(b) determining a target longitudinal position Xt of the follower aircraft with respect to the longitudinal position of the leader aircraft;
(c) calculating a difference Xt−Xr between the target longitudinal position Xt of the follower aircraft with respect to the leader aircraft and the obtained real longitudinal position Xr of the follower aircraft with respect to the leader aircraft;
(d) comparing a value of the difference Xt−Xr with at least one predefined threshold;
(e) choosing a control law for controlling the speed of the follower aircraft (Af), from among at least two separate control laws, on the basis of the comparison;
(f) applying the chosen control law so as to manage the real longitudinal position Xr of the follower aircraft with respect to the position of the leader aircraft, and,
(g) applying, through the chosen control law SCf, when said chosen control law SCf comprises a term equal to a difference between the speed Sl of the leader aircraft and the speed Sf of the follower aircraft, a filter to a value of said difference between the speed Sl of the leader aircraft and the speed Sf of the follower aircraft in order to estimate a relative bias on the speed of the leader aircraft, and wherein the follower aircraft executes the chosen control law to adjust the real longitudinal position Xr of the follower aircraft with respect to the position of the leader aircraft.

9. An aircraft comprising the system according to claim 8.